US006260162B1

(12) United States Patent
Typaldos et al.

(10) Patent No.: US 6,260,162 B1
(45) Date of Patent: Jul. 10, 2001

(54) TEST MODE PROGRAMMABLE RESET FOR A WATCHDOG TIMER

(75) Inventors: Melanie D. Typaldos, Buda; David A. Spilo, Austin; Martin Schuessler, Pflugerville, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/183,915

(22) Filed: Oct. 31, 1998

(51) Int. Cl.[7] .............................. G06F 11/00
(52) U.S. Cl. .............................. 714/55; 714/25
(58) Field of Search .............................. 714/55, 23, 41, 714/703, 2, 25, 815; 703/28

(56) References Cited

U.S. PATENT DOCUMENTS

| | | | | |
|---|---|---|---|---|
| 4,956,842 | * | 9/1990 | Said . | |
| 5,036,334 | * | 7/1991 | Henderson et al. . | |
| 5,233,613 | | 8/1993 | Allen et al. | 371/163 |
| 5,513,319 | * | 4/1996 | Finch et al. . | |
| 5,694,444 | | 12/1997 | Bagchi et al. | 377/54 |

OTHER PUBLICATIONS

Advanced Micro Devices, Inc. "Am186™ER and Am188™ER Microcontrollers User's Manual", Copyright 1998, pp. 8–1 through 8–3.

Advanced Micro Devices, Inc. "Am186™ED/EDLV", May 1997, pp. 1–2 and 45, Publicationπ21336, Rev: A Amendment/0.

Advanced Micro Devices, Inc. "Am186™ES and Am188™ES", Jan. 1996, pp. 1–3,54, 61 and 62, Publicationπ20002, Rev. A Amendment/0.

Microchip Technology, Inc., "Microchip PIC16/17 Microcontroller Data Book", May 1995, pp. DS00158A, DS00158A–p. ii, DS30412A–pp. 2–825, 2–921, 2–925, 2–926, 2–929 and 2–936.

* cited by examiner

*Primary Examiner*—Gopal C. Ray
(74) *Attorney, Agent, or Firm*—Akin, Gump, Strauss, Hauer & Feld, L.L.P.

(57) ABSTRACT

A processor-oriented device provides a watchdog timer having a test mode programmable reset. When the device is placed in a test mode by pulling a test mode hardware pin during a reset of the timer and then an appropriate write key is provided to the timer, a watchdog timer reset count is writeable, allowing for a programmable duration for a watchdog timer reset. The watchdog timer reset count may be a reset duration value maintained by a watchdog timer reset counter. Based on both a test mode signal from watchdog timer test mode enable logic and a write key, watchdog timer reset write enable logic enables writes to the watchdog timer reset count.

23 Claims, 5 Drawing Sheets

TEST MODE PROGRAMMABLE RESET FOR A WATCHDOG TIMER

SPECIFICATION

BACKGROUND OF THE INVENTION

1. Field of the Invention

The present invention relates to test support for processor-oriented devices, and more particularly to a test mode programmable reset for a watchdog timer.

2. Description of the Related Art

MICROCONTROLLERS

As technology advances, computer system components are providing specific services which previously were offered by a microprocessor or the computer system as a whole. A centerpiece of this advancing technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or Am186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. An execution unit should be free to perform the programmed task to which it is dedicated, rather than spending time waiting on other units within the microcontroller.

WATCHDOG TIMERS

An embedded system or other processor-oriented device such as a microcontroller-based device frequently provides a watchdog timer for permitting recovery or escape from software malfunctions. When a watchdog timer is enabled, the watchdog timer requires periodic refreshing; otherwise, after a programmed timeout period, the watchdog timer generates a watchdog timeout. Responsive to a watchdog timeout, a microcontroller is reset to restore control of a runaway software process.

In the past, a watchdog timer of the microcontroller has provided an internal reset signal for resetting the microcontroller. More recently, however, a microcontroller has also provided an external reset signal for resetting external devices (i.e., the entire system) after a watchdog timer timeout. The internal reset signal has been utilized in generating the external reset signal.

For a microcontroller providing an external reset signal, both an internal reset signal and an external reset signal may be asserted during a watchdog timer reset. In normal operation, the microcontroller is held in reset after a watchdog timer timeout for a period of time sufficiently long for all potential external devices to be reset. Since a watchdog timer acts as a fail-safe device, the duration of the watchdog timer reset has not been programmable during normal operation.

SUMMARY OF THE INVENTION

Briefly, a processor-oriented device (e.g., microcontroller) according to the present invention provides a watchdog timer having a test mode programmable reset. When the device is placed in a test mode by pulling a test mode hardware pin during a reset of the timer and then an appropriate write key is provided to the timer, a watchdog timer reset count is writeable, allowing for a programmable duration for a watchdog timer reset. In a disclosed embodiment, the watchdog timer reset count is a reset duration value maintained by a watchdog timer reset counter. The watchdog timer reset counter is provided in a watchdog timer reset control block of the watchdog timer and is programmed by a watchdog timer control register. Writes to the watchdog timer reset count are enabled in a test mode by watchdog timer reset write enable logic. In a disclosed embodiment, the watchdog timer reset write enable logic is a key detect logic block. The watchdog timer reset write enable logic receives a test mode signal from watchdog timer test mode enable logic of the device for indicating detection of the test mode. The watchdog timer reset write enable logic also receives a write key for granting write access to the watchdog timer reset count in a test mode. The watchdog timer test mode enable logic enables the test mode via pulling of the test mode hardware pin. The watchdog timer thus uniquely provides a hardware protection mechanism and software protection mechanism for maintaining the integrity of the watchdog timer during a test mode programmable reset. In the past, a long watchdog timer reset time has been expensive during production testing of a microcontroller-based device and prohibitive during simulation of a microcontroller-based device.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT RELATED APPLICATION

Commonly-assigned U.S. patent application Ser. No. 09/056,509, entitled EMULATOR SUPPORT MODE FOR DISABLING AND RECONFIGURING TIME-OUTS OF A WATCHDOG TIMER, is hereby incorporated by reference as if set forth in its entirety.

Figure 1:
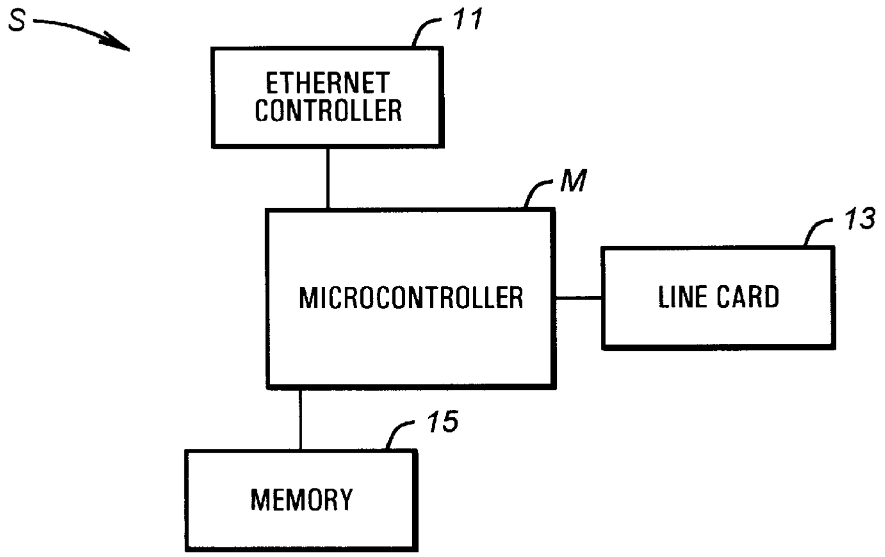
FIG. 1 is a simplified block diagram of a system including a microcontroller.

Turning now to the drawings, FIG. 1 shows a simplified block diagram of an exemplary processor-oriented device or system S incorporating a microcontroller M. The microcontroller M is illustrated as controlling three system components: an Ethernet controller 11, a line card 13, and a memory 15. The illustrated system components are exemplary as the microcontroller M may be configured to control a variety of system components. Some examples of other potential system components include a modem, a printer, a scanner, a disk drive, and a fax machine.

Figure 2A:
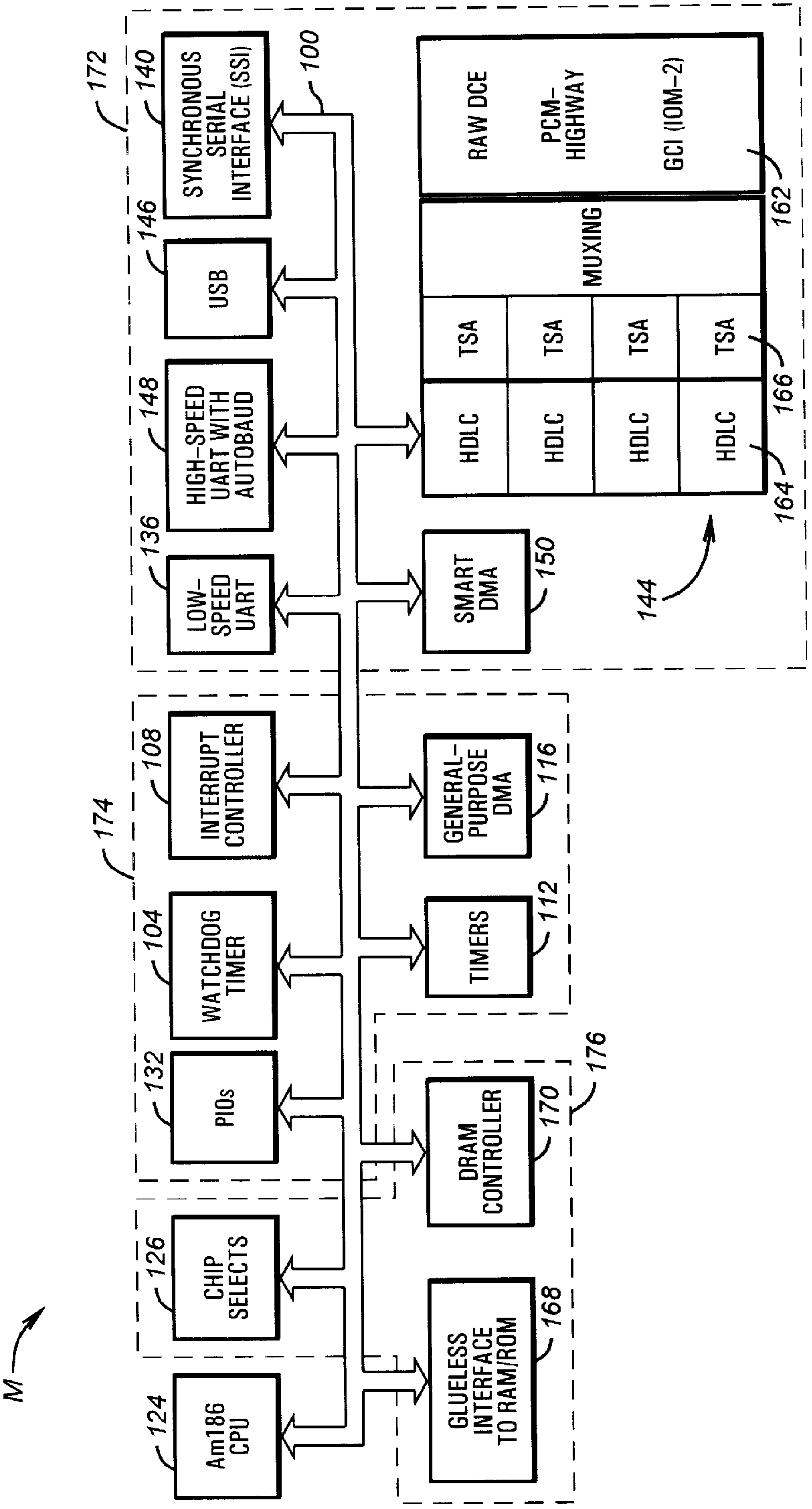
FIG. 2A is a block diagram of the microcontroller of FIG. 1 in accordance with the present invention.

Turning to FIG. 2A, shown is a block diagram of a typical microcontroller M implemented according to the invention. Such a microcontroller is preferably implemented on a single monolithic integrated circuit.

The microcontroller M preferably includes an internal bus 100 coupling an execution unit 124, system peripherals 174, memory peripherals 176 and serial communication peripherals 172. The execution unit 124 in the disclosed embodiment is compatible with the Am186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 10 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller M include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well-suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 2B:
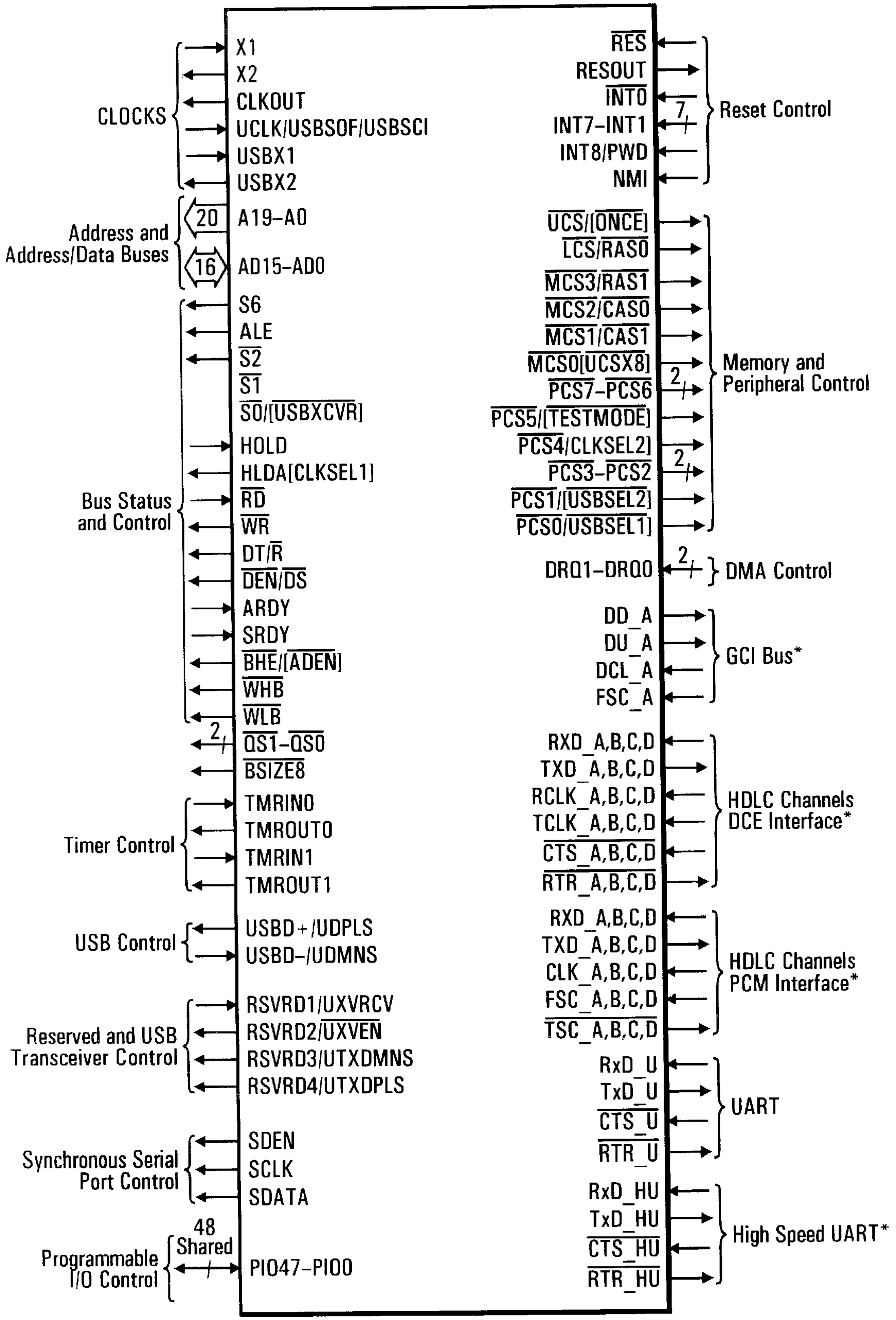
FIG. 2B is a pinout diagram for the microcontroller of FIGS. 1 and 2A.

Turning to FIG. 2B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

Figure 3:
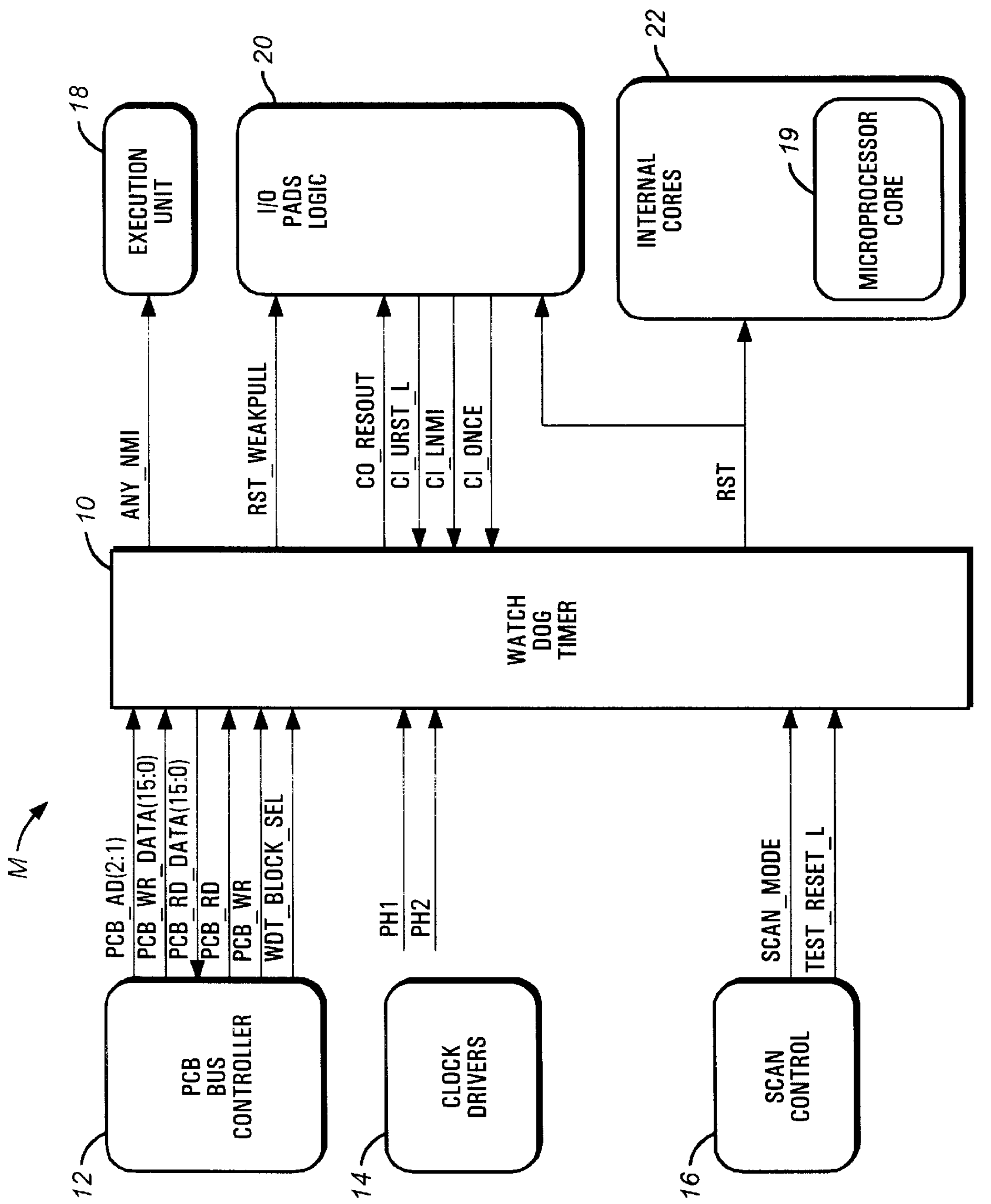
FIG. 3 is a block diagram of the microcontroller of FIGS. 1 and 2A illustrating a watchdog timer and associated cores in accordance with the present invention.

FIG. 3 is a block diagram of a microcontroller M including a watchdog timer 10 in accordance with the present invention. The microcontroller M may be used to provide a variety of control functions for the processor-oriented device S. The watchdog timer 10 is used to regain control of the processor-oriented device S if software run by the microcontroller M fails to respond or behave as expected. When the watchdog timer 10 is active, a repetitive software function is required to access the timer 10 and reset the timer 10 at a rate that is faster than a timeout value of the timer 10. If the timer 10 is not reset before the duration of the watchdog timer timeout interval, the timer 10 may generate a reset of the microcontroller M, a reset of the processor-oriented device S, or a non-maskable interrupt (NMI). An internal reset of the microcontroller M is provided as an internal reset signal RST by the timer 10 to various internal cores 22 of the microcontroller M. Examples of internal cores 22 which may receive the internal reset signal RST include the DMA controller 116 or 150, a microprocessor core 19, timers, counters, an interrupt controller 108, a universal serial bus (USB) controller 146, a bus interface unit, an execution unit 124, a chip-select unit 126, a peripheral control block (PCB) bus controller 12, and miscellaneous logic. The internal reset signal RST is also provided to I/O pads logic 20 to latch the state of various input pins of the microcontroller M when an externally generated reset occurs. The internal reset signal RST is used to gate a reset out signal CO_RESOUT which is used to reset system components external to the microcontroller M. If a watchdog timer NMI event occurs rather than a reset, then the timer 10 provides an ANY_NMI signal to the execution unit 124.

Various signals are provided between the watchdog timer 10 and the I/O pads logic 20. The watchdog timer 10 provides a RST_WEAKPULL signal and a reset out signal CO_RESOUT to the I/O pads logic 20. The RST_WEAKPULL signal is asserted when either a CI_URST_L signal is asserted or the internal reset signal RST is asserted. The RST_WEAKPULL signal is used by the I/O pads logic 20 to enable a pull-up at an I/O pad 21. A pull-up ensures that an input path is properly terminated during an externally generated reset or a reset due to a watchdog timer timeout. The RST_WEAKPULL signal may also be used to enable a pull-down termination in an I/O pad 21. The CI_URST_L signal is provided from the I/O pads logic 20 to the watchdog timer 10. This signal is asserted in response to an externally generated reset. A CI_LNMI signal is also provided by the I/O pads logic 20 to the watchdog timer 10. The CI_LNMI signal is driven from the external NMI pin and is ORed together with the timeout NMI source to generate the ANY_NMI output signal. During a watchdog timer reset, the reset out signal CO_RESOUT is held for multiple cycles to provide a signal of sufficient duration to ensure reset of various system components external to the microcontroller M which may exist on a board housing the watchdog timer 10. The reset out signal CO_RESOUT is active if both the internal reset signal RST and the EXRST bit are asserted or if the CI_URST_L signal indicating an externally generated reset is asserted. The reset out signal CO_RESOUT goes to the pads and generates an external reset signal RESOUT.

The input signals provided by the PCB bus controller 12 to the watchdog timer 10 include a PCB_AD signal, a PCB_WR_DATA signal, a PCB_RD signal, a PCB_WR signal, and a WDT_BLOCK_SEL signal. In the disclosed embodiment, the PCB_AD signal consists of 2 bits, and the PCB_WR_DATA signal consists of 16 bits. The PCB_AD signal represents a PCB address bus used in conjunction with the WDT_BLOCK_SEL signal to decode accesses to PCB registers in the watchdog timer 10. The PCB_WR_DATA signal represents a PCB write data bus containing data to be written to PCB registers in the watchdog timer 10. The PCB_RD signal indicates a read cycle from the PCB bus controller 12, and the PCB_WR signal indicates a write cycle from the PCB bus controller 12. The WDT_BLOCK_SEL signal is used to select PCB registers in the timer 10. The PCB_RD_DATA signal provided by the timer 10 to the PCB bus controller 12 represents a PCB read data bus containing data read from the PCB registers in the timer 10. In the disclosed embodiment, the PCB_RD_DATA signal consists of 16 bits.

The clock drivers 14 and scan control core 16 also provides signals to the watchdog timer 10. The clock drivers 14 provides a PH1 signal representing one system clock and a PH2 signal representing a second system clock. The scan control core 16 provides a SCAN_MODE signal for enabling a scan mode. Use and operation of a scan mode is known in the art. The scan control core 16 also provides a TEST_RESET_L signal that is multiplexed with the internal reset signal RST for resetting scan blocks. A table including each of the signals discussed above is provided below:

| Signal Name | Description |
|---|---|
| PCB_AD(2:1) | PCB address bus from the PCB bus controller used in conjunction with the WDT_BLOCK_SEL input to decode the WDT register accesses. |
| PCB_WR_DATA(15:0) | PCB Write Data bus contains the data to be written to the PCB registers. |
| PCB_RD_DATA(15:0) | PCB Read Data bus contains the data read from the PCB registers. |
| PCB_RD | PCB read indicates a read cycle from the PCB bus controller. |
| PCB_WR | PCB write indicates a write cycle from the PCB bus controller. |
| WDT_BLOCK_SEL | Select for WDT block PCB registers. |
| PH1 | PH1 one system clock. |
| PH2 | PH2 two system clock. |
| ANY_NMI | Non-maskable interrupt indication to the execution unit. This signal is asserted as a result of the watchdog timer NMI event or when the CI_LNMI input is asserted. |
| CI_LNMI | External NMI request from the I/O pad logic. Asserted when an external NMI is asserted high and synchronized. |
| CI_URST_L | Externally generate Reset input from the Reset I/O PAD logic. |
| RST_WEAKPULL | Reset Pull Up Control. This signal is used to enable the weak pullups and pulldowns in the pads. |
| RST | This is the primary reset for all internal cores. RST is asserted when CI_URST_L (external reset) is asserted or when a WDT reset event occurs. |
| CO_RESOUT | This the external reset signal provided by the part to the board. |
| SCAN_MODE | Scan mode enable. |
| TEST_RESET_L | The WDT muxes the value of TEST_RESET_L with RST to allow for a reset of the scan blocks. |

It should be understood that the microcontroller M may integrate a variety of functions in addition to the functions of the watchdog timer 10. These other functions may for example include interrupt control, DMA control, synchronous serial port control, bus control, memory control, peripheral control, programmable I/O control, address control, and clock control. A wide variety of microcontrollers could be used instead of the disclosed microcontroller M without detracting from the spirit of the invention. Further, although the term microcontroller is sometimes used to denote a processor with memory implemented on a single integrated circuit, here the term more broadly includes embedded controllers, microprocessors, digital signal processors (DSPs) and the like.

Figure 4:
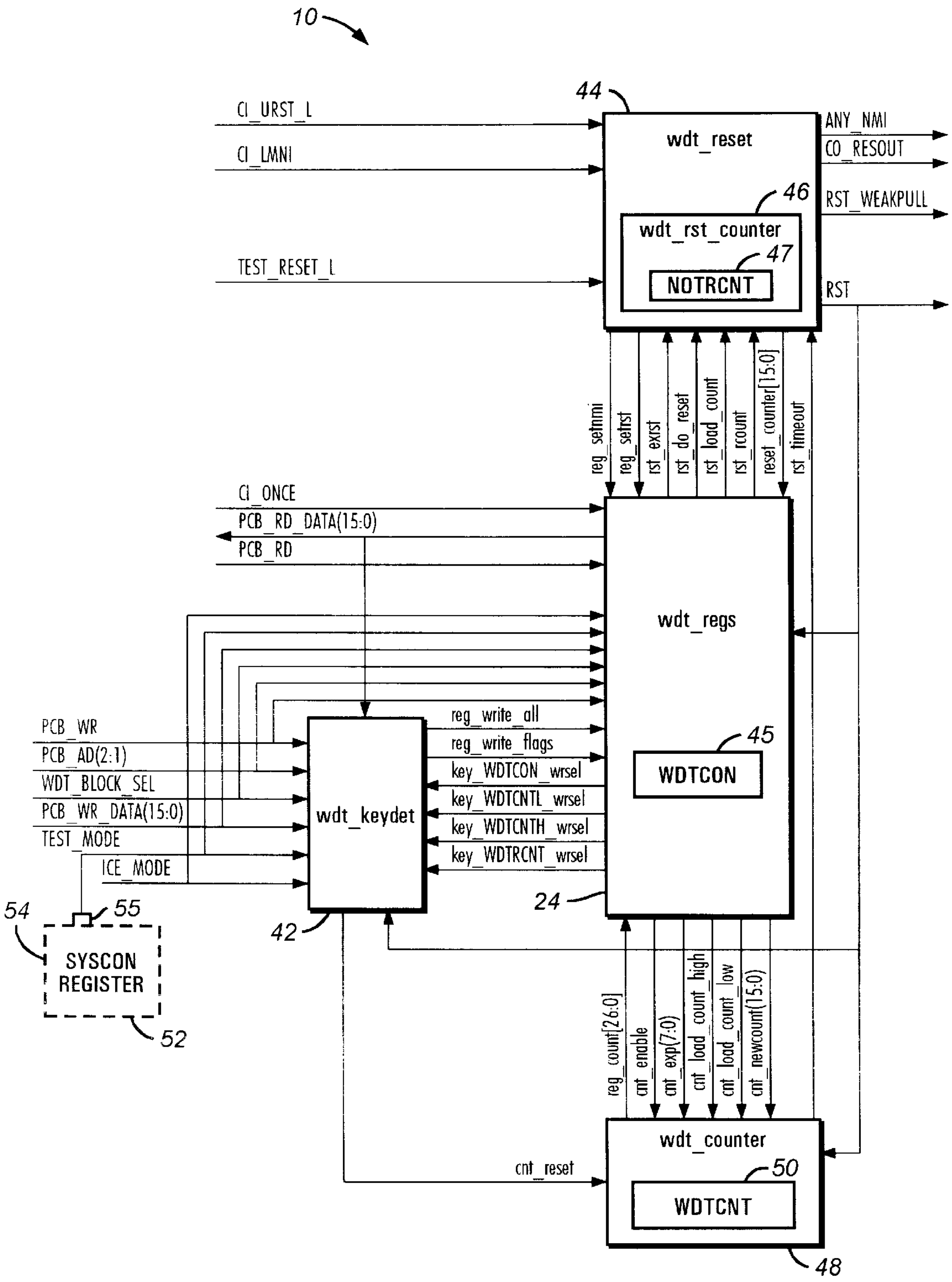
FIG. 4 is a logic block diagram of the watchdog timer of FIG. 3 in accordance with the present invention.

Turning to FIG. 4, a logic block diagram of an exemplary embodiment of the watchdog timer 10 is shown. The watchdog timer 10 includes a key detect block wdt_keydt 42, a register control block wdt_regs 24, a reset control block wdt_reset 44, and a counter block wdt_counter 48.

WATCHDOG KEY DETECT BLOCK

The watchdog timer 10 supports two unique keyed sequences which are recognized by the key detect block wdt_keydet 42. In the disclosed embodiment, 3333h followed by CCCCh serves as a write key, and AAAAh followed by 5555H serves as a count-clear key. A write key is generally used in opening a particular watchdog timer register or counter, and a count-clear key may be used in clearing a watchdog timer current counter WDTCNT 50. Any number of processor cycles, including memory and I/O reads and writes, may be inserted between the first data pattern of a key and the second data pattern of a key.

The write key may be used to open a WDTCON register 45 in the register control block wdt_regs 24. The WDTCON register 45 includes a watchdog timer enable bit ENA. When the ENA bit is set to '1', the watchdog timer 10 is enabled. When the ENA bit is set to '0', the watchdog timer 10 is disabled. The key detect block wdt_keydet 42 provides a reg_write_all signal and a reg_write_flags signal to the WDTCON register 45. The timer register control block wdt_regs 24 uses these signals to determine which bits are to be updated during a write. If a write has been previously detected which sets the ENA bit, the reg_write_flags signal is asserted. If a write has not been detected which sets the ENA bit since the last reset, the reg_write_all signal is asserted when the write key is detected. If neither the reg_write_all signal nor the reg_wrte flags signal is asserted, then no bits in the WDTCON register 45 are updated. If the reg_write_flags signal is asserted, only an NMIFLAG bit and a RSTFLAG bit in the WDTCON register 45 may be updated.

Register select signals are generated by the register control block wdt_regs 24 and provided to the key detect block wdt_keydet 42. Each register select signal is used to indicate when a particular register is visible based on the mode of operation of the watchdog timer 10. A key_WDTCON_wrsel signal corresponds to the watchdog timer control register WDTCON 45 (FIG. 4). A key_WDTCNTL_wrsel signal corresponds to the watchdog timer count low register WDTCNTH. A key_WDTCNTH_wrsel signal corresponds to a watchdog timer count high register WDTCNTH. A key_WDTRCNT_wrsel signal corresponds to a watchdog timer reset counter wdt_rst_counter 46 (FIG. 4). The signals PCB_WR, PCB_AD, PCB_WR_DATA, and WDT_BLOCK_SEL are provided by the PCB bus controller 12 to the key detect block wdt_keydet 42. The key detect block wdt_keydet 42 is thereby used to control access to registers within the register control block wdt_regs 24. The use of a write key provided to the key detect block wdt_keydet 42 serves as the software requirement or protection mechanism for write access to the watchdog timer reset counter wdt_rst_counter 46.

The microcontroller M includes a system configuration (SYSCON) register 52 for enabling an internal debug or test mode, TEST MODE, for the watchdog timer 10. The SYSCON register 52 is shown in broken line to indicate that the SYSCON register 52 lies within the device S but is external to the watchdog timer 10. The SYSCON register 52 includes a TEST_MODE bit 54 for enabling the TEST MODE. In the disclosed embodiment, the TEST MODE bit 54 is set by pulling a test mode hardware pin 55 during a reset of the timer 10. The test mode hardware pin 55 serves as the hardware requirement protection mechanism for write access to the watchdog timer reset counter wdt_rst_counter 46. By providing both a hardware protection mechanism and a software protection mechanism, the integrity of the timer 10 during a reset is especially maintained. For example, with both a hardware protection mechanism and a software protection mechanism, software alone cannot to compromise the integrity of the timer 10. The TEST_MODE bit 54 also provides a TEST_MODE signal to the key detect block wdt_keydet 42. When the TEST_MODE bit 54 is set, the TEST_MODE signal is asserted. When the TEST_MODE bit 54 is not set, the TEST_MODE signal is deasserted. Setting the TEST_MODE bit 54 in the SYSCON register 52 during a reset of the timer 10 in combination with the appropriate write key allows the watchdog timer reset counter 46 wdt_rst_counter to be written with a new value. The TEST_MODE bit 54 alternatively may be enabled by the hardware pin 55 and written through software.

WATCHDOG REGISTER CONTROL BLOCK

In the internal test mode, TEST MODE, all fields of the WIDTCON register 45 are readable and writable. Those fields are shown below. The internal reset signal RST is used to force all bits of the WDTCON register 45 to their reset state.

WatchDog Timer Control Register (WDTCON)

| | 15 | 14 | 13 | 12 | 11 | 10 | 9 | 8 |
|---|---|---|---|---|---|---|---|---|
| Bit | ENA | WRST | RSTFLAG | NMIFLAG | | RES | | EXRST |
| R/W | R/W | R/W | R/W(0) | RJW(0) | R | R | R | R/W |
| Default | 1 | 1 | 0 | 0 | 0 | 0 | 0 | 1 |

| 7 | 6 | 5 | 4 | 3 | 2 | 1 | 0 |
|---|---|---|---|---|---|---|---|
| | | | | ES | | | |
| R/W | R/W | R/W | R/W | R/W | R/W | R/W | R/W |
| 1 | 0 | 0 | 0 | 0 | 0 | 0 | 0 |

In the disclosed embodiment, the watchdog timer control register WDTCON 45 is a 16-bit register. Bit 15 is defined as the watchdog timer enable bit ENA. The ENA bit is a read/write bit having a default value of '1.' When the ENA bit is set to '1,' the watchdog timer 10 is enabled. When the ENA bit is set to '0', the watchdog timer 10 is disabled. Bit 14 is defined as a watchdog request signal WRST. The WRST bit is a read/write bit having a default value of '1.' When the WRST bit is set to '1,' the watchdog timer 10 generates an internal or system reset when a watchdog timer timeout occurs. When the WRST bit is set to '0' and the NMIflag bit is set to '0,' the watchdog timer 10 generates an NMI when a watchdog timer timeout occurs. Bit 13 is defined as a reset flag bit RSTFLAG. The RSTFLAG bit is a read/write '0' bit. When the RSTFLAG bit is set to '1,' a watchdog timer reset event has occurred. When the RSTFLAG bit is set to '0,' a watchdog timer reset event has not occurred. Further, the RSTFLAG bit may be cleared by software.

Bit 12 is defined as an NMIFLAG bit. The NMIFLAG bit is a read/write '0' bit. When the NMIFLAG bit is set to '1,' a watchdog timer NMI event has occurred. If a watchdog timer timeout event occurs while the NMIFLAG bit is set, the watchdog timer 10 generates a system reset regardless of the setting of the WRST bit. When the NMIFLAG bit is set to '0,' a watchdog timer NMI event has not occurred. The NMIflag bit also may be cleared by software. In the disclosed embodiment, bits 11 through 9 are reserved. Bit 8 is defined as an external reset enable bit EXRST. The EXRST bit is a read/write bit having a default value of '1.' When the EXRST bit is set to '1,' the watchdog timer 10 generates an external reset signal RESOUT whenever a watchdog timer reset event occurs. When the EXRST bit is set to '0,' the external reset signal RESOUT has not been generated during watchdog timer resets. The EXRST bit is set by an externally generated reset and is not changed by a watchdog timer reset. bits. Bit 7 of the ES bits has a default value of '1' and bits 6 through 0 of the ES bits have a default value of '0.' The exponent select field ES determines the duration of the watchdog timer timeout interval. The watchdog timer exponent selections table provided below represents how different bit combinations of the exponent select field ES result in different timeout intervals.

| Bit 7 | Bit 6 | Bit 5 | Bit 4 | Bit 3 | Bit 2 | Bit 1 | Bit 0 | Exponent |
|---|---|---|---|---|---|---|---|---|
| 0 | 0 | 0 | 0 | 0 | 0 | 0 | 0 | N/A |
| X | X | X | X | X | X | X | 1 | 10 |
| X | X | X | X | X | X | 1 | 0 | 20 |
| X | X | X | X | X | 1 | 0 | 0 | 21 |
| X | X | X | X | 1 | 0 | 0 | 0 | 22 |
| X | X | X | 1 | 0 | 0 | 0 | 0 | 23 |
| X | X | 1 | 0 | 0 | 0 | 0 | 0 | 24 |
| X | 1 | 0 | 0 | 0 | 0 | 0 | 0 | 25 |
| 1 | 0 | 0 | 0 | 0 | 0 | 0 | 0 | 26 |

The timeout duration is a function of an exponent and a frequency of a central processing unit (CPU) core 19 in the microcontroller M. The equation for calculating the timeout duration follows:

$$\text{Timeout Duration} = 2^{Exponent}/\text{CPU frequency.}$$

With this equation, timeout duration is the timeout period for the watchdog timer 10 in seconds. Exponent is the value given from the table above, and CPU frequency is the operating speed of the CPU 19 in Hertz (Hz).

WATCHDOG COUNTER BLOCK

Various signals are provided between the watchdog counter block wdt_counter 48 and the watchdog register control block wdt_regs 24. A cnt_enable signal is provided from the register control block wdt_regs 24 to the counter block wdt_counter 48. The cnt_enable signal is used by the counter block wdt_counter 48 to enable a watchdog timer current counter WDTCNT 50 (FIG. 4). The watchdog timer current counter WDTCNT 50 represents the current count of the watchdog timer 10. The current count is increased once for every PH1 uu clock cycle while the cnt_enable signal is asserted. The current count is cleared if a cnt_reset signal is asserted by the key detect block wdt_keydet 42 indicating that the count clear key has been detected or that a write which enabled the timer 10 has just occurred. The current count is also cleared if the counter 50 matches a compare value and a rst_timeout signal provided by the counter block wdt_counter 48 to the reset control block wdt_reset 44 is asserted. The rst_timeout signal is generated when a bit is set in the watchdog timer current counter WDTCNT 50 that is also set in the ES field of the WDTCON register 45. Multiple cnt_exp signals are used to pass the value of the ES field and the WDTCON register 45 to the counter block wdt_counter 48. An additional event causing the current count to be cleared is the assertion of the internal reset signal RST. The current count is provided from the counter block wdt_counter 48 to the register control block wdt_regs 24 as a reg_count signal.

A cnt_newcount bus for containing a new count is provided from the register control block wdt_regs 24 to the counter block wdt_counter 48. In the disclosed embodiment, the cnt_newcount bus is 16 bits. A cnt_load_count_low signal is used to load data from the cnt_newcount bus into the lower 16 bits of the watchdog timer current counter WDTCNT 50. The cnt_load_count_high signal is used to load data from the cnt_new_countbus into bits 26:16 of the watchdog timer current counter WDTCNT 50.

In the internal test mode, TEST MODE, the current count of the watchdog timer 10 is readable and writeable through the watchdog timer count low register WDTCNTL and the watchdog timer count high register WDTCNTH.

| WatchDog Timer Count Low Register (WDTCNTL) | | | | | | | | |
|---|---|---|---|---|---|---|---|---|
| | 15 | 14 | 13 | 12 | 11 | 10 | 9 | 8 |
| Bit | COUNTL | | | | | | | |
| R/W | R/W | R/W | R/W | R/W | R/W | R/W | R/W | R/W |
| Default | 0 | 0 | 0 | 0 | 0 | 0 | 0 | 0 |
| | 7 | 6 | 5 | 4 | 3 | 2 | 1 | 0 |
| Bit | COUNTL | | | | | | | |
| R/W | R/W | R/W | R/W | R/W | R/W | R/W | R/W | R/W |
| Default | 0 | 0 | 0 | 0 | 0 | 0 | 0 | 0 |

In the disclosed embodiment, the watchdog timer count low register WDTCNTL is a 16-bit register defining a COUNTL field. Also, in the disclosed embodiment, the COUNTL field is the 16 least significant bits of the watchdog timer current counter WDTCNT 50. The value of the COUNTL field is automatically reset when the watchdog timer 10 is enabled. The COUNTL field is reset by writing a write key to the WDTCON register 45.

| WatchDog Timer Count High Register (WDTCNTH) | | | | | | | | |
|---|---|---|---|---|---|---|---|---|
| | 15 | 14 | 13 | 12 | 11 | 10 | 9 | 8 |
| BIT | RESERVED | | | | | | COUNTH | |
| R/W | R | R | R | R | R | R/W | R/W | R/W |
| Default | 0 | 0 | 0 | 0 | 0 | 0 | 0 | 0 |
| | 7 | 6 | 5 | 4 | 3 | 2 | 1 | 0 |
| BIT | COUNTH | | | | | | | |
| R/W | R/W | R/W | R/W | R/W | R/W | R/W | R/W | R/W |
| Default | 0 | 0 | 0 | 0 | 0 | 0 | 0 | 0 |

In the disclosed embodiment, the watchdog timer count high register WDTCNTH is a 16-bit register. Bits 11 through 15, which are read-only, are preferably reserved. Bits 0 through 10 represent the COUNTH field. The bits within the COUNTH field are readable and writeable. The default value for each bit within the COUNTH field is '0.' The value of the COUNTH field is automatically reset when the watchdog timer 10 is enabled. In a normal operation mode, the COUNTH field is reset by writing a write key to the WDTCON register 45. In the disclosed embodiment, the COUNTH field is the eleven most significant bits of the watchdog timer current counter WDTCNT 50.

| Watchdog Timer Reset Count (WDTRCNT) | | | | | | | | |
|---|---|---|---|---|---|---|---|---|
| | 7 | 6 | 5 | 4 | 3 | 2 | 1 | 0 |
| Bit | RCOUNT | | | | | | | |
| R/W | W | W | W | W | W | W | W | W |
| Default | 0 | 0 | 0 | 0 | 0 | 0 | 0 | 0 |
| | 15 | 14 | 13 | 12 | 11 | 10 | 9 | 8 |
| Bit | RCOUNT | | | | | | | |
| R/W | W | W | W | W | W | W | W | W |
| Default | 0 | 0 | 0 | 0 | 0 | 0 | 0 | 0 |

In the disclosed embodiment, the watchdog timer reset count WDTRCNT 47 is a 16-bit field. Each bit of the reset count WDTRCNT 47 is writeable and has a default value of '0.' Bits 15 through 0 of the reset count WDTRCNT 47 define the RCOUNT field. In the disclosed embodiment, the RCOUNT field contains the one's compliment of the number of processor clocks for which the internal reset signal RST should be asserted during a watchdog timer reset.

The reset count WDTRCNT 47 is writeable only in the internal test mode, TEST MODE. In the TEST MODE, the reset count WDTRCNT 47 may be written with a reset duration value. The reset count WDTRCNT 47 thus stores a programmable duration for a watchdog timer reset termed a watchdog timer reset count WDTRCNT 47. In a conventional watchdog timer, it has not been possible to program a watchdog timer reset count. In accordance with the present invention, a programmable test mode reset allows for reduction in the time necessary to test the device S. The programmable test mode reset also may be used to chain short test cases into a single test case, thereby improving test throughout and optimizing test vector usage.

In the internal test support mode, TEST MODE, if a write is detected and the reg_write signal is asserted, then the rst_load_count signal is generated. The rst_load_count signal is used to load a new value for the reset duration of the internal reset signal RST from PCB_WR_DATA[15:0] to the watchdog reset counter wdt_rst_counter 46.

WATCHDOG RESET CONTROL BLOCK

Various signals are provided between the watchdog register block wdt_regs 24 and the watchdog reset control block wdt_reset 44. A reg_setnmi signal and a reg_setrst signal are provided from the reset block wdt_reset 44 to the register control block wdt_regs 24. The reg_setnmi signal is asserted to indicate that a watchdog timer NMI has occurred. The reg_setnmi signal causes the NMIFLAG bit of the WDTCON register 45 to be set. The reg_setrst signal is asserted to indicate that a watchdog timer reset event has occurred. The reg_setrst signal causes the RSTFLAG bit of the WDTCON register 45 to be set.

When reg_setrst signal is not asserted and the internal reset signal RST is asserted, each bit of the WDTCON register 45 is placed in a reset condition. When both the internal reset signal RST and reg_setrst signal are asserted, each bit of the WDTCON register 45 except the RSTFLAG and EXRST bits is placed in a reset condition. For its reset condition, after a watchdog timer reset, the RSTFLAG is set to '1'. For a watchdog timer reset condition, the EXRST bit retains its previously programmed value. A rst_do_reset signal is provided from the register block wdt_regs 24 to the reset block wdt_reset 44. The rst_do_reset signal is asserted when the WRST bit of the WDTCON register 45 is set or when the NMIFLAG bit of the WDTCON register 45 is set. When the rst_do_reset signal is asserted, the register control block wdt_regs 24 performs a reset, rather than an NMI when the watchdog timer 10 times out. The watchdog reset block 44 also receives the rst_timeout signal from the watchdog counter block wdt_counter 48. The rst_timeout signal indicates to the wdt_reset block 44 that a watchdog timer timeout has occurred.

The reset block wdt_reset 44 includes the reset counter wdt_rst_counter 46 used to time the duration of the reset out signal CO_RESOUT during a watchdog timer reset. When the rst_do_reset signal is asserted and the rst_timeout signal goes active, the reset counter wdt_rst_counter 46 begins incrementing on the next clock and the internal reset signal RST is asserted. In an alternative embodiment, the timer reset count WDTRCNT 47 might be maintained or advanced through decrementing. The reset counter wdt_rst_counter 46 continues to count as long as the internal reset signal RST is asserted. When the most significant bit of the reset counter wdt_rst_counter 46 becomes set, the internal reset signal RST is deasserted. One clock later, the reset counter wdt_rst_counter 46, including the most significant bit, is cleared to zero. On a watchdog timer reset, the internal reset signal RST thus remains asserted until the reset counter wdt_rst_counter 46 reaches its maximum count. Writing of the reset counter wdt_rst_counter 46 is controlled by the register control block wdt_regs 24 described above.

Figure 5:
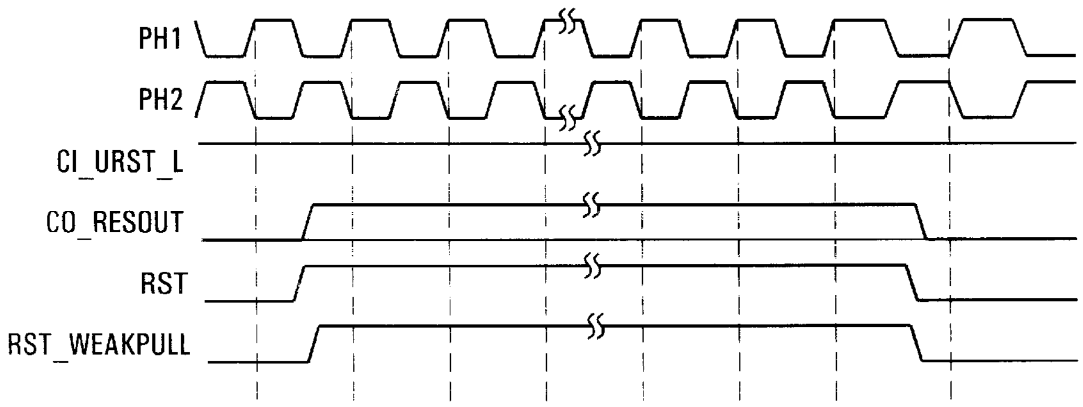
FIG. 5 is a timing diagram for watchdog timer reset timing in accordance with the watchdog timer of FIG. 4.

Referring to FIG. 5, a timing diagram illustrating timeout reset timing of the timer 10 is shown. The timer 10 runs off the PH1 clock and the PH2 clock. A rst_timeout signal is an indication from the timer counter block wdt_counter 48 to the timer reset block wdt_reset 44 that a watchdog timeout has occurred. The CI_URST_L reset signal is inactive so that the rst_timeout signal may effect reset timing behavior. The internal reset signal RST and the RST_WEAKPULL signal assert on the first PH2 cycle following assertion of the rst_timeout signal. The internal reset signal RST and the RST_WEAKPULL signal remain asserted until the reset counter wdt_rst_counter 46 reaches its maximum count. The CO_RESOUT signal follows the internal reset signal RST when the EXTRST bit is set in the WDTCON register 45. If the EXTRST bit is not set, the CO_RESOUT signal remains unasserted through a watchdog reset.

Thus, in accordance with the present invention, a watchdog reset count is programmable in a debug mode. This programmability permits a watchdog timer reset to be cycled many times without appreciable delay. Such programmability is particularly useful for testing a particular bit. Rather than executing a countdown until a bit change event is expected, the watchdog reset count may be programmed to a value preceding a change in the particular bit. Testing of a particular bit of the watchdog reset count is thereby accomplished in a faster manner. It should be understood that ways to change a reset count for a watchdog timer in a debug mode other than the disclosed techniques are possible. Further, it should be understood that a test mode programmable reset in accordance with the present invention is applicable to any counter of a watchdog timer, such as a watchdog timer current counter, for example.

Throughout this disclosure, the terms "sef", "assert", "active", and the like refer to driving a signal to its true state. The terms "deassert", "not asserted", "inactive" and the like refer to a signal which is not driven to its true state.

The foregoing disclosure and description of the preferred embodiment are illustrative and explanatory thereof, and various changes in the number of bits, number of signals, order of steps, field sizes, connections, components, and materials, as well as in the details of the illustrated hardware and construction and method of operation may be made without departing from the spirit of the invention.

We claim:

1. A watchdog timer adapted for a test mode programmable reset, comprising:

a watchdog timer reset control block for setting a watchdog timer reset for the watchdog timer; and watchdog timer reset write enable logic for enabling writes to a watchdog timer reset count of the watchdog timer reset control block in a test mode.

2. The watchdog timer of claim 1, further comprising:

a watchdog timer control register for programming the watchdog timer reset control block.

3. The watchdog timer of claim 2, the watchdog timer reset write enable logic comprising:

watchdog timer reset key detect logic for signaling the watchdog timer control register to program the watchdog timer reset count responsive to detection of a write key in the test mode.

4. The watchdog timer of claim 2, wherein the watchdog timer control register loads a reset duration value to the watchdog timer reset control block.

5. The watchdog timer of claim 1, the watchdog timer reset control block comprising:

a watchdog timer reset counter for maintaining the watchdog timer reset count.

6. The watchdog timer of claim 1, wherein the watchdog timer reset write enable logic detects a test mode signal indicating the watchdog timer is in a test mode.

7. A microcontroller having a test mode supporting a programmable watchdog timer reset, comprising:

a microprocessor; and a watchdog timer coupled to the microprocessor, comprising:

a watchdog timer reset control block for setting a watchdog timer reset for the watchdog timer; and watchdog timer reset write enable logic for enabling writes to a watchdog timer reset count of the watchdog timer reset control block in a test mode.

8. The microcontroller of claim 7, the watchdog timer further comprising:

a watchdog timer control register for programming the watchdog timer reset control block.

9. The microcontroller of claim 8, the watchdog timer reset write enable logic comprising:

watchdog timer reset key detect logic for signaling the watchdog timer control register to program the watchdog timer reset count responsive to detection of a write key in the test mode.

10. The microcontroller of claim 8, wherein the watchdog timer control register loads a reset duration value to the watchdog timer reset control block.

11. The microcontroller of claim 7, the watchdog timer reset control block comprising:

a watchdog timer reset counter for maintaining the watchdog timer reset count.

12. The microcontroller of claim 7, wherein the watchdog timer reset write enable logic detects a test mode signal indicating the watchdog timer is in a test mode.

13. The microcontroller of claim 7, further comprising:

watchdog timer test mode enable logic having a test mode hardware pin for enabling the test mode during a reset of the watchdog timer.

14. A method of programming a reset for a watchdog timer, comprising the steps of:

pulling a test mode hardware pin to place the watchdog timer in a test mode during a reset of the watchdog timer;

providing a write key to gain write access to a watchdog timer reset count of the watchdog timer following placement of the watchdog timer in a test mode; and programming the watchdog timer reset count.

15. The method of claim 14, the watchdog timer including a watchdog timer reset counter, the programming step comprising the step of:

loading a reset duration value to the watchdog timer reset counter.

16. The method of claim 14, further comprising the step of:

detecting the pulling of the test mode hardware pin placing the watchdog timer in a test mode.

17. A system for supporting a test mode programmable reset, comprising:

a microprocessor; and a watchdog timer coupled to the microprocessor, comprising:

a watchdog timer reset control means for setting a watchdog timer reset count for the watchdog timer; and a watchdog timer reset write enable means for enabling writes to the watchdog timer reset count in a test mode.

18. The system of claim 17, the watchdog timer further comprising:

a watchdog timer control means for programming the watchdog timer reset control means.

19. The system of claim 18, the watchdog timer reset write enable means comprising:

a watchdog timer reset key detect means for signaling the watchdog timer control means to program the watchdog timer reset count responsive to detection of a write key in the test mode.

20. The system of claim 17, wherein the watchdog timer reset write enable means detects a test mode signal indicating the watchdog timer is in a test mode.

21. The system of claim 17, the watchdog timer reset control means comprising:

a watchdog timer reset counting means for maintaining the watchdog timer reset count.

22. The system of claim 17, further comprising:

a watchdog timer test mode enable means for enabling the test mode.

23. The system of claim 22, the watchdog timer test mode enable means comprising:

a test mode hardware pin means for enabling the test mode during a reset of the watchdog timer.

* * * * *